United States Patent
Conway, Sr. et al.

(10) Patent No.: US 9,832,372 B1
(45) Date of Patent: Nov. 28, 2017

(54) DYNAMIC VEDIOTELPHONY SYSTEMS AND METHODS OF USING THE SAME

(71) Applicants: Jerry L. Conway, Sr., Hoover, AL (US); Ming Jiang, Alpharetta, GA (US)

(72) Inventors: Jerry L. Conway, Sr., Hoover, AL (US); Ming Jiang, Alpharetta, GA (US)

( * ) Notice: Subject to any disclaimer, the term of this patent is extended or adjusted under 35 U.S.C. 154(b) by 0 days.

(21) Appl. No.: 15/462,801

(22) Filed: Mar. 18, 2017

(51) Int. Cl.
```
H04N 7/14      (2006.01)
H04N 5/232     (2006.01)
H04N 7/15      (2006.01)
H04R 1/02      (2006.01)
H04L 29/06     (2006.01)
G06K 9/00      (2006.01)
```
(52) U.S. Cl.
CPC ....... *H04N 5/23219* (2013.01); *H04L 65/403* (2013.01); *H04N 5/23206* (2013.01); *H04N 5/23212* (2013.01); *H04N 7/142* (2013.01); *H04N 7/147* (2013.01); *H04N 7/15* (2013.01); *H04R 1/028* (2013.01); *G06K 9/0061* (2013.01); *G06K 9/00604* (2013.01); *H04R 2499/11* (2013.01)

(58) Field of Classification Search
CPC .... H04N 7/15; H04N 17/04; H04N 21/23439; H04N 21/258; H04N 21/25891; H04N 21/4223; G02B 7/287; G02B 13/02; G02B 2213/025; G28D 15/046
USPC ......... 348/14.01, 14.05, 14.07, 14.08, 14.09, 348/14.1, 14.12, 14.16
See application file for complete search history.

(56) References Cited

U.S. PATENT DOCUMENTS

| | | | | |
|---|---|---|---|---|
| 5,765,045 A * | 6/1998 | Takagi | ................... | G02B 7/287 396/51 |
| 2007/0070177 A1* | 3/2007 | Christensen | ............. | H04N 7/15 348/14.01 |
| 2008/0069397 A1* | 3/2008 | Bartsch | ................. | G06F 19/321 382/100 |
| 2010/0208078 A1* | 8/2010 | Tian | ........................ | G06T 7/277 348/169 |
| 2012/0086769 A1* | 4/2012 | Huber | ...................... | H04N 7/15 348/14.08 |
| 2013/0091515 A1* | 4/2013 | Sakata | ................... | H04N 17/04 725/10 |

(Continued)

*Primary Examiner* — Binh Tieu
(74) *Attorney, Agent, or Firm* — Ming Jiang

(57) ABSTRACT

Aspects of present disclosure relates to a dynamic videotelephony system. In certain embodiments, dynamic videotelephony system includes a first dynamic videotelephony device for a first user group, and a second dynamic videotelephony device for a second user group, and a network connecting these two dynamic videotelephony devices for a dynamic video conference between the two user groups. Each of the dynamic videotelephony devices has a gaze detection device group to detect a corresponding principal location of pupils of a corresponding user group, and sends control instructions to the opposite dynamic videotelephony device to control dynamic video capturing such that the captured dynamic video is focused and centered at an object corresponding to the corresponding principal location of pupils of the corresponding user group on the corresponding dynamic video display device, and the captured dynamic video is transmitted from the opposite dynamic videotelephony device to corresponding dynamic videotelephony device for display.

19 Claims, 10 Drawing Sheets

(56) References Cited

U.S. PATENT DOCUMENTS

2014/0160340 A1* 6/2014 Farnand ............ H04N 5/23293
348/333.11

\* cited by examiner

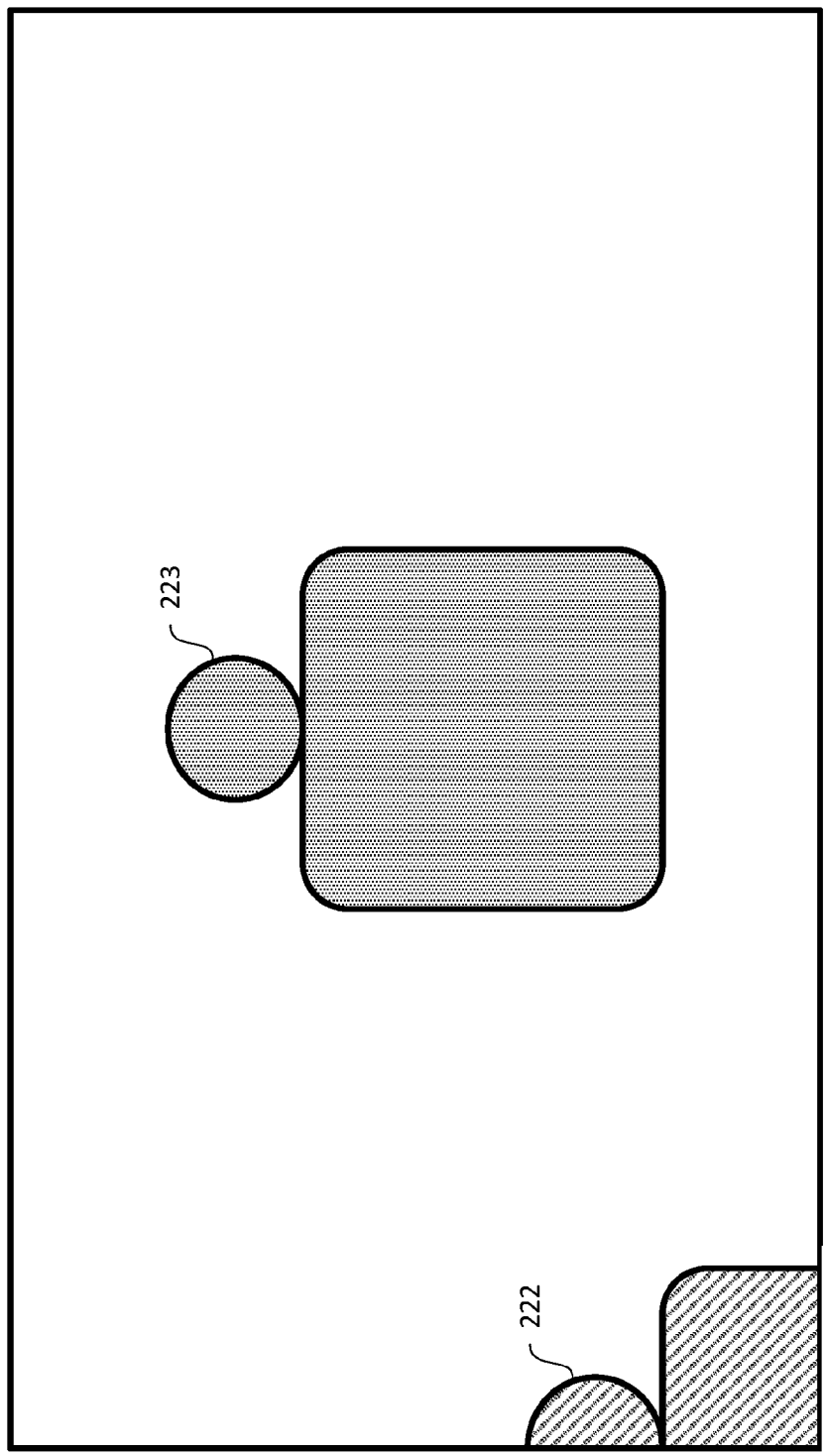

DYNAMIC VEDIOTELPHONY SYSTEMS AND METHODS OF USING THE SAME

FIELD

The present disclosure generally relates to video telephony, and more particularly to dynamic videotelephony systems and methods of using the dynamic videotelephony systems.

BACKGROUND

Skype, FaceTime and many other applications may be used for a video conference. Usually the front facing camera is fixed, therefore, the video images showing on the other end of a video conference are usually fixed, and its corresponding visual scene and viewing angle are limited by the angle of its camera. It is difficult for users viewing the captured video/images to control what object the camera on the other end should focus on and even more so to adjust the viewing angles of the other camera. It is desirable to have a video conference system that can focus on what viewers want to see, and adjust the viewing areas based on where users are looking at.

Therefore, heretofore unaddressed needs still exist in the art to address the aforementioned deficiencies and inadequacies.

SUMMARY

In one aspect, the present disclosure relates to a dynamic videotelephony device. In certain embodiments, the dynamic videotelephony device includes: a dynamic video display device, a camera group, and a gaze detection device group. The dynamic video display device displays a visual scene of a second user group to a first user group. The second user group is using a second dynamic videotelephony device to hold a dynamic video conference with the first user group. The camera group captures dynamic video signals of the first user group, transmits the captured dynamic video signals over a network to the second dynamic videotelephony device to be displayed on a second dynamic video display device of the second dynamic videotelephony device. The gaze detection device group detects and tracks a principal location of pupils of the first user group on the dynamic video display device and transmits the principal location of pupils of the first user group to the second dynamic videotelephony device to control a second camera group of the second dynamic videotelephony device. A portion of the dynamic video signals of the visual scene of the second user group is transmitted to the dynamic videotelephony device and displayed on the dynamic video display device 150 of the dynamic videotelephony device. The portion of the dynamic video signals is selected from the dynamic video signals captured by the second camera group, and the selected portion of the dynamic video signals is focused and centered at an object corresponding to the principal location of the pupils of the first user group on the dynamic video display device.

In certain embodiments, the dynamic videotelephony device 100 may include tablet computers, smart phones, electronic gaming devices, notebook computers, laptop computers, kiosks, computer monitors, security systems and television displays.

In another aspect, the present disclosure relates to a dynamic videotelephony system. In certain embodiments, the dynamic videotelephony system includes at least a first dynamic videotelephony device as a host of a dynamic video conference for a first user group, an opposite, second dynamic videotelephony device as a participant of the dynamic video conference for a second user group, and a network connecting the first dynamic videotelephony device and the second dynamic videotelephony device for the dynamic video conference between the first user group using the first dynamic videotelephony device and the second user group using the second dynamic videotelephony device.

In certain embodiments, each of the first dynamic videotelephony device and the second dynamic videotelephony device includes: a corresponding dynamic video display device, a corresponding camera group, and a corresponding gaze detection device group.

In yet another aspect, the present disclosure relates to a method of holding a dynamic video conference between a first dynamic videotelephony device and an opposite second dynamic videotelephony device. In certain embodiments, the method includes: connecting, by the first dynamic videotelephony device having a first camera group and a first gaze detection device group, to the second dynamic videotelephony device having a second camera group and a second gaze detection device group through a network, receiving, by the first dynamic videotelephony device, dynamic video signals of a second user group captured by the second camera group of the second dynamic videotelephony device, and displaying the received dynamic video signals on a first dynamic video display device of the first dynamic videotelephony device, and detecting, by a first gaze detection device group of the first dynamic videotelephony device, a principal location of the pupils of a first user group on the first dynamic video display device. The principal location of the pupils of the first user group is a location of pupils of a person of the first user group at or near a center of a visual scene of the first user group, and generating coordinates of the principal location of the pupils of the first user group.

In certain embodiments, the method also includes: sending, by the first dynamic videotelephony device, control instructions having the coordinates of the principal location of the pupils of the first user group to the second dynamic videotelephony device. When executed by a processor of the second dynamic videotelephony device, the control instructions cause the second dynamic videotelephony device to focus on the object corresponding to the coordinates of the principal location of the pupils of the first user group shown on the first dynamic video display device, to capture dynamic video signals through the second camera group. The captured dynamic video signals are focused and centered at the object shown on the coordinates of the principal location of the pupils of the first user group. The control instructions also cause the second dynamic videotelephony device to transmit the captured dynamic video signals to the first dynamic videotelephony device to display on the first dynamic video display device of the first dynamic videotelephony device.

In certain embodiments, the method may also include: tracking, by a first gaze detection device group of the first dynamic videotelephony device, the principal location of the pupils of the first user group on the first dynamic video display device, and generating new coordinates of the principal location of the pupils of the first user group when the principal location of the pupils of the first user group on the first dynamic video display device is changed, and sending, by the first dynamic videotelephony device, control instructions having the new coordinates of the principal location of the pupils of the first user group to the second dynamic videotelephony device. When executed by the second dynamic videotelephony device, the control instructions cause the second dynamic videotelephony device to focus on a new object corresponding to the new coordinates of the principal location of the pupils of the first user group shown on the first dynamic video display device, to capture dynamic video signals through the second camera group. The captured dynamic video signals are focused and centered at the new object shown on the new coordinates of the principal location of the pupils of the first user group. The control instructions also cause the second dynamic videotelephony device to transmit the captured dynamic video signals to the first dynamic videotelephony device.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein:

FIGS. 7A, 7B and 7C show a portion of the visual scene of the second user group when a first principal location of pupils of the first user group falls on the second user, the first user and the third user of the second user group and the portion of the visual scene is focused and centered at the second user, the first user and the third user of the second user group, respectively according to certain embodiments of the present disclosure.

DETAILED DESCRIPTION

Figure 1:
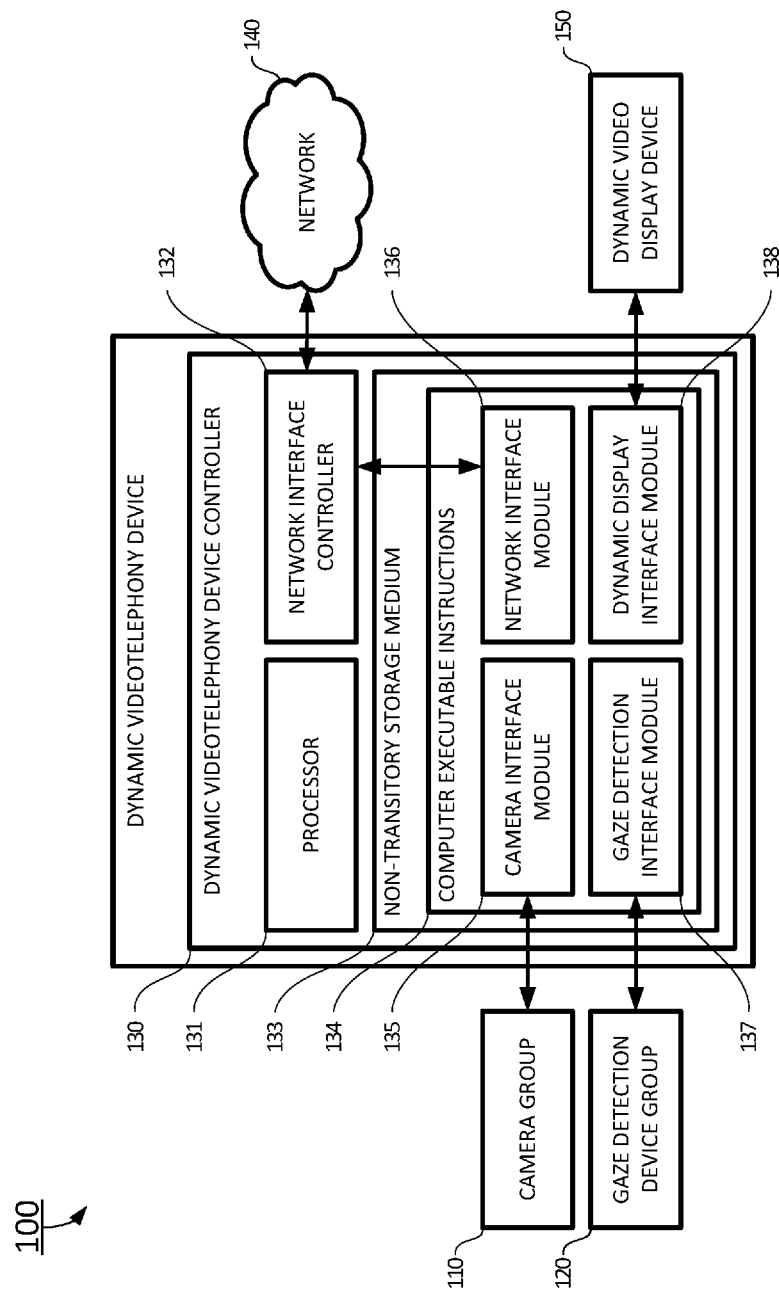
FIG. 1 schematically shows a block diagram of a dynamic videotelephony device according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in a different order (or concurrently) without altering the principles of the present disclosure.

As used herein, the term module/device may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module/device may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Figure 4:
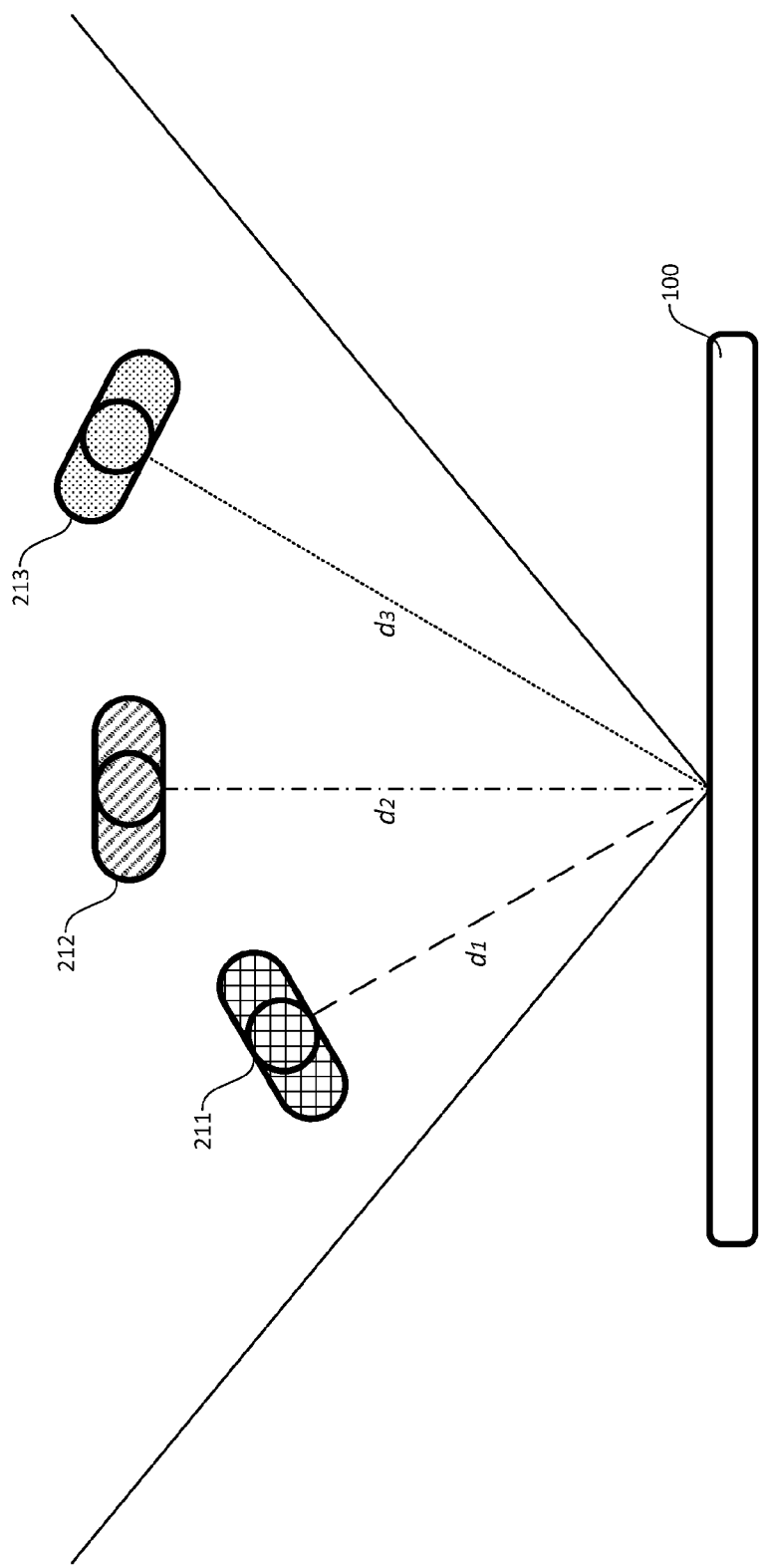
FIG. 4 shows a user group situated in front of an exemplary dynamic videotelephony device according to another embodiment of the present disclosure.

In one aspect, the present disclosure relates to a dynamic videotelephony device 100 as shown in FIG. 1. In certain embodiments, the dynamic videotelephony device 100 includes: a dynamic video display device 150, a camera group 110, and a gaze detection device group 120. A first user group 210 is situated in front of the dynamic videotelephony device 100, as shown in FIG. 4. In this embodiment, the first user group 210 includes a first user 211, a second user 212, and a third user 213. Each of the first user 211, the second user 212, and the third user 213 has a distance corresponding d1, d2 and d3, respectively, from the camera 111. The dynamic videotelephony device 100 receives a visual scene of a second user group 220 (not shown in FIG. 1 and FIG. 4) and the dynamic video display device 150 of the dynamic videotelephony device 100 displays the visual scene of the second user group 220 to the first user group 210. In one embodiment, the second user group 220 includes a first user 221, a second user 222, and a third user 223. The second user group 220 is using a second dynamic videotelephony device 102 (not shown in FIG. 1 and FIG. 4) to hold a dynamic video conference with the first user group 210.

Figure 2:
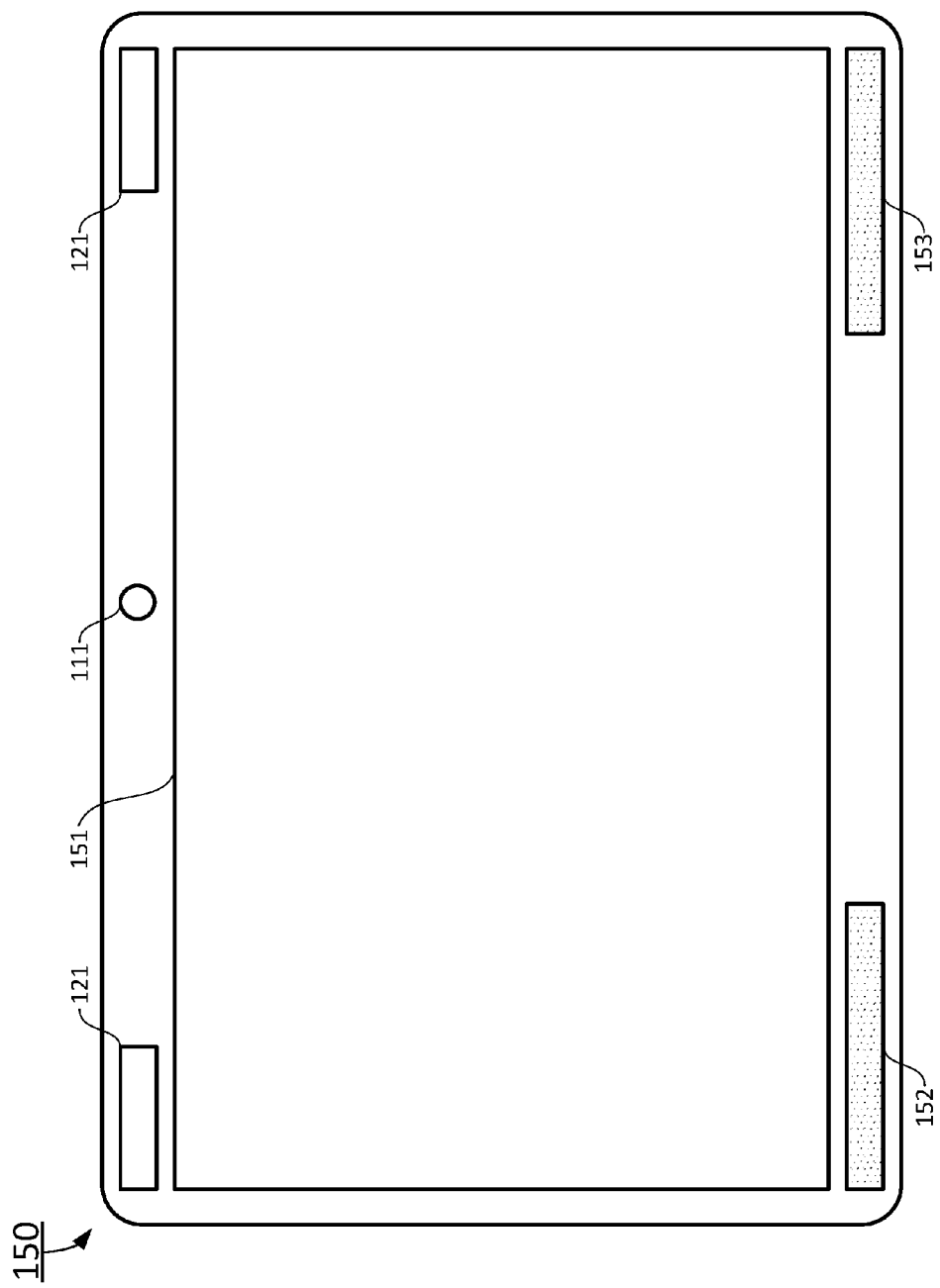
FIG. 2 illustrates an exemplary dynamic videotelephony device according to one embodiment of the present disclosure.

Referring now to FIG. 2, an exemplary dynamic videotelephony device is shown according to one embodiment of the present disclosure. In this embodiment, the dynamic videotelephony device includes a camera 111, a left gaze detection device 121, a right gaze detection device 122, a display screen 151, a left speaker 152, and a right speaker 153. The camera 111 utilizes a proprietary Active Compound Focal Depth technology. This capability permits the recipient to define the focal point of the image the he/she sees on his/her device based on his/her gaze. In other words, the recipient can change the actual focal depth of the cameras used to record video/images over distance in real-time. This means that the cameras on the transmitting device are slaved to the display of the device of the recipient and vise versa.

Figure 3:
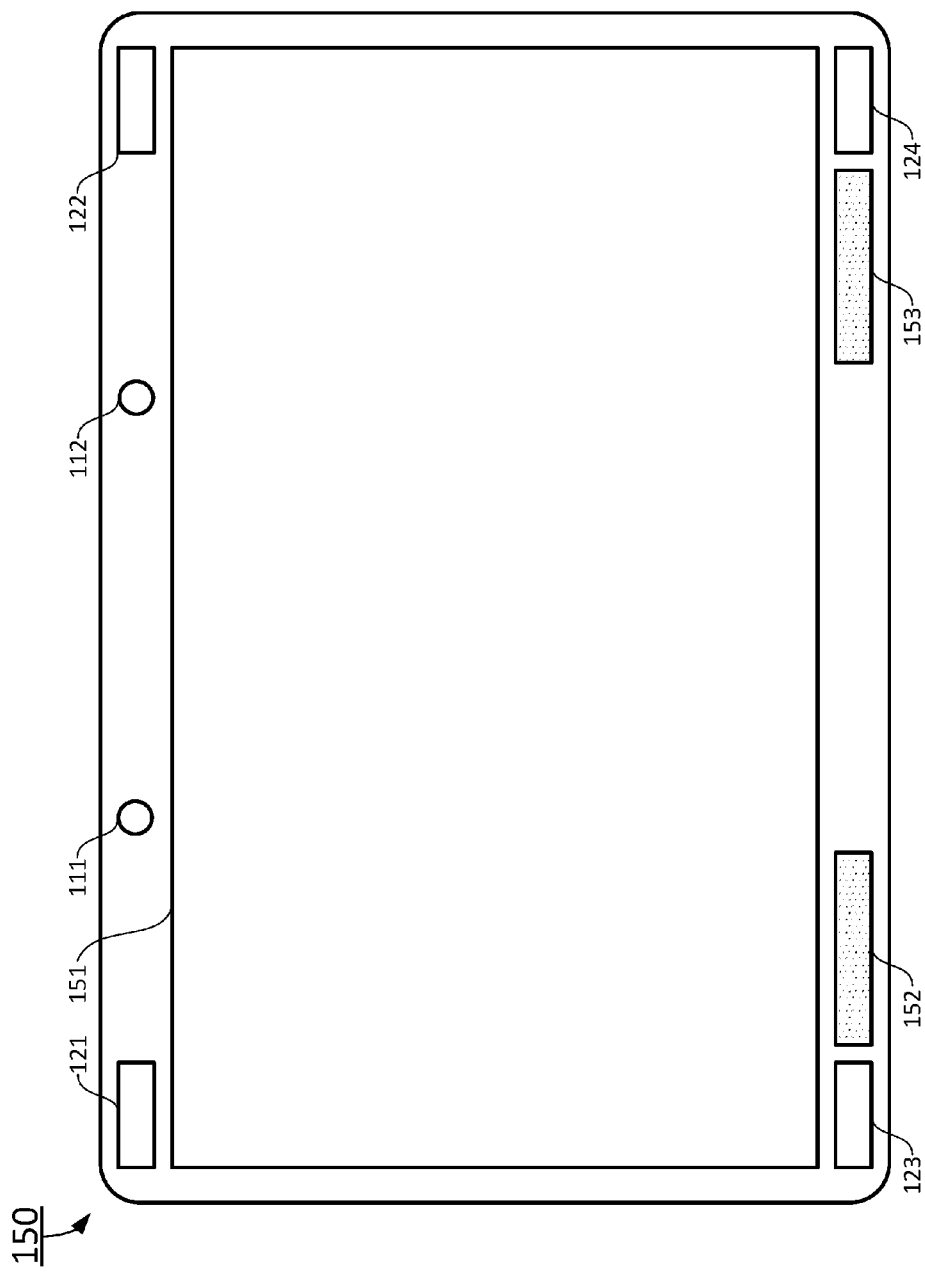
FIG. 3 illustrates another exemplary dynamic videotelephony device according to another embodiment of the present disclosure.

Referring now to FIG. 3, another exemplary dynamic videotelephony device is shown according to another embodiment of the present disclosure. In this embodiment, the dynamic videotelephony device includes at least two cameras 111 and 112 for capturing stereoscopic video/images, four gaze detection devices 121, 122, 123 and 124 positioned at four corners of the dynamic videotelephony device for more accurate tracking and detection of gaze of the user group, a display screen 151, a left speaker 152, and a right speaker 153. The cameras 111 and 112 also utilize the proprietary Active Compound Focal Depth technology.

In certain embodiments, the dynamic videotelephony device 100 may include tablet computers, smart phones, electronic gaming devices, notebook computers, laptop computers, kiosks, computer monitors, security systems and television displays.

A camera of a first camera group 110 captures dynamic video signals of the first user 211, transmits the captured dynamic video signals over the network 140 to the second dynamic videotelephony device 102 to be displayed on a second dynamic video display device of the second dynamic videotelephony device 102. A camera of a second camera group captures dynamic video signals of the first user 221, the second user 222, and the third user 222 of the second user group, transmits the captured dynamic video signals over the network 140 to the first dynamic videotelephony device 101 to be displayed on a first dynamic video display device of the first dynamic videotelephony device 101.

The gaze detection device group 120 detects and tracks a principal location of pupils of the first user group 210 on the dynamic video display device 150 and transmits the principal location of pupils of the first user group 210 to the second dynamic videotelephony device 102 to control the second camera group of the second dynamic videotelephony device 102. When the first user group 210 includes more than one person, it is difficult for the gaze detection devices differentiate gazes of different people. Therefore, in certain embodiments, the principal location of pupils of the first user group 210 is defined as a location of pupils of a person of the first user group 210 at or near a center of a visual scene of the first user group 210.

In certain embodiments, a portion of the dynamic video signals of the visual scene of the second user group 220 is transmitted to the dynamic videotelephony device 100 and displayed on the dynamic video display device 150 of the dynamic videotelephony device 100. The portion of the dynamic video signals is selected from the dynamic video signals captured by the second camera group, and the selected portion of the dynamic video signals is focused and centered at an object corresponding to the principal location of pupils of the first user group 210 on the dynamic video display device 150.

In certain embodiments, the camera group 110 includes one or more active compound focal depth cameras 111, 112, . . . , and 11N, where N is a positive integer. The gaze detection device group 120 includes one or more gaze detection devices 121, 122, . . . , and 12M, where M is a positive integer. Each of first user group 210 and the second user group 220 includes one or more users. In one embodiment, the first user group 210 includes a first user 211, a second user 212, and a third user 213 as shown in FIG. 4.

Figure 5:
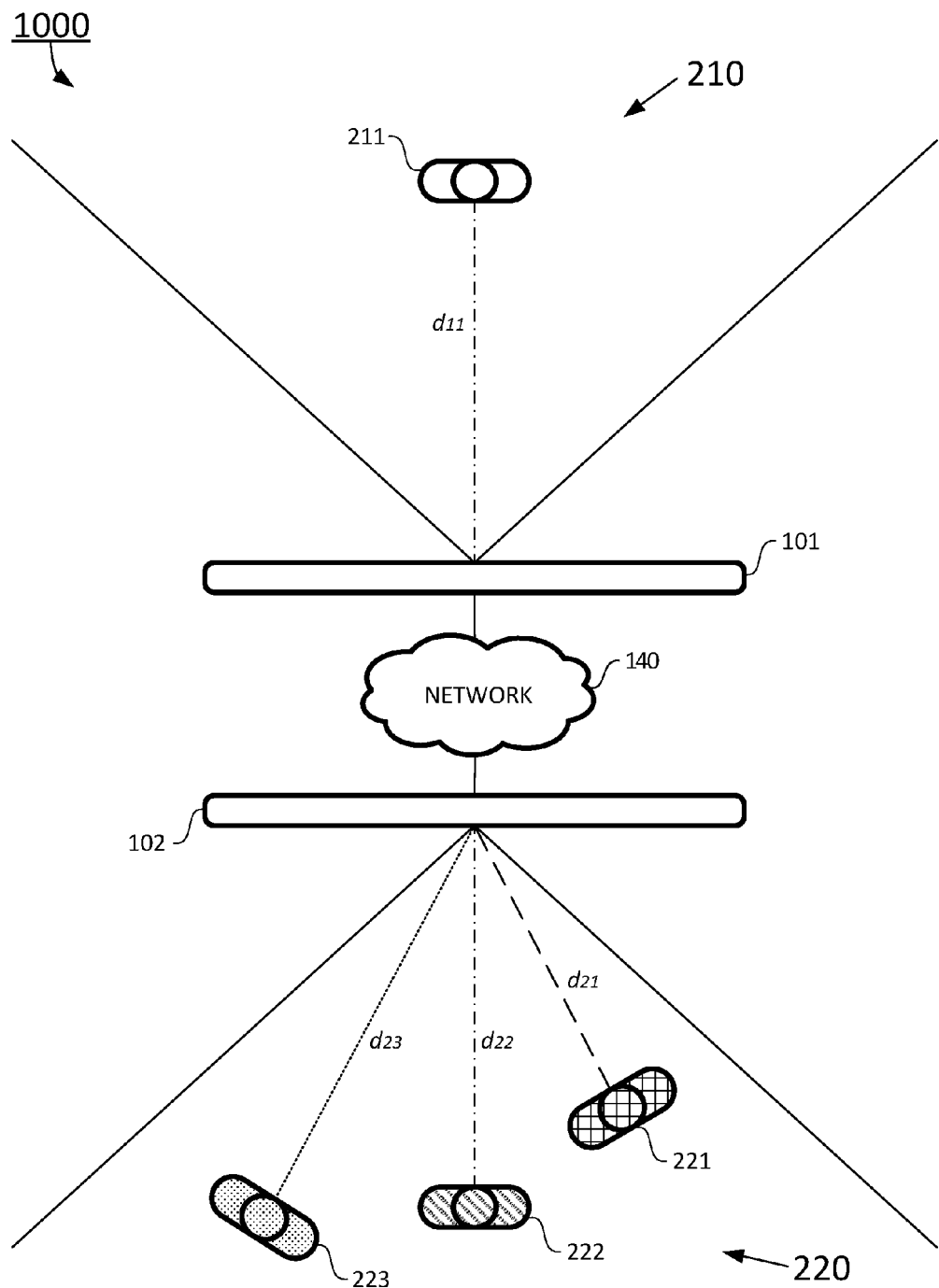
FIG. 5 shows an exemplary video conference having a first dynamic videotelephony device for a first user group and a second dynamic videotelephony device for a second user group situated, and both dynamic videotelephony devices are connected through a network according to another embodiment of the present disclosure.

In certain, as shown in FIG. 5, a single user 211 of the first user group 210 is positioned in front of a first dynamic videotelephony device 101, and three users 221, 222, and 223 are positioned in front of a second dynamic videotelephony device 102. The first user 211 has a focal distance of d11 from the camera of the first dynamic videotelephony device 101. Each of the first user 211, the second user 212, and the third user 213 has a distance corresponding d21, d22 and d23, respectively, from the camera of the second dynamic videotelephony device 102. The first dynamic videotelephony device 101 and the second dynamic videotelephony device 102 are communicatively connected to each other by a network 140. In certain embodiments, the network 140 includes the internet, an intranet, a Wi-Fi network, a Bluetooth connection, an enterprise network, a local area network (LAN), a wide area network (WAN), a metropolitan area network (MAN), a campus area network (CAN), a virtual private network (VPN), a telecommunication network, and a wireless communication network.

Referring back to FIG. 1, in certain embodiments, the dynamic videotelephony device 100 may also include a dynamic videotelephony device controller 130. The dynamic videotelephony device controller 130 includes a network interface controller 132 to connect the dynamic videotelephony device 100 to the network 140, a processor 131, and a non-transitory storage medium 133. The non-transitory storage medium 133 stores computer executable instructions 134. When executed by the processor 131, the computer executable instructions 134 cause the processor 131 to perform various functions of the dynamic videotelephony device 100.

In certain embodiments, the computer executable instructions 134 includes at least a camera interface module 135, a network interface module 136, a gaze detection interface module 137, and a dynamic display interface module 138. The network interface module 136 receives control instructions from the second dynamic videotelephony device 102 to control the camera group 110, and transmits control instructions to the second dynamic videotelephony device 102 to control the second camera group 1102 through a network interface controller 132 over the network 140. The network interface module 136 also receives the dynamic video signals captured by the second dynamic videotelephony device 102 to display on the dynamic video display device 150 and transmits the dynamic video signals captured by the dynamic videotelephony device 100 to the second dynamic videotelephony device 102 to display on the second dynamic video display device through the network interface controller 132 over the network 140.

In certain embodiments, the camera interface module 135 receives the control instructions from the second dynamic videotelephony device 102 to focus on one or more objects of the visual scene of the first user group 210, captures the dynamic video signals of the visual scene of the first user group 210 using the camera group 110, and transmits the captured dynamic video signals to the second dynamic videotelephony device 102 to display on the second dynamic video display device of the second dynamic videotelephony device 102.

In certain embodiments, the gaze detection interface module 137 detects and tracks the principal location of pupils of the first user group 210, and transmit the control instructions having the principal location of pupils of the first user group 210 on the dynamic video display device 150 to the second dynamic videotelephony device 102 to control the second camera group 1102 of the second dynamic videotelephony device 102.

In certain embodiments, the dynamic display interface module 138 receives the dynamic video signals captured by the second dynamic videotelephony device 102, processes the received dynamic video signals to determine the portion of the dynamic video signals to display on the dynamic video display device 150 according to the control instructions such that the displayed portion of the dynamic video signals is focused and centered at the object corresponding to the principal location of pupils of the first user group 210 on the dynamic video display device 150. In certain embodiments, the dynamic video display device 150 may also include an audio playback device such as the left speaker 152 and the right speaker 153, as shown in FIG. 2, for playing audio signals of the dynamic video signals received from the second camera group of the second dynamic videotelephony device 102.

In another aspect, the present disclosure relates to a dynamic videotelephony system 1000. In certain embodiments, the dynamic videotelephony system 1000, as shown in FIG. 5, includes at least a first dynamic videotelephony device 101 as a host of a dynamic video conference for a first user group 210, an opposite, second dynamic videotelephony device 102 as a participant of the dynamic video conference for a second user group 220, and a network 140 connecting the first dynamic videotelephony device 101 and the second dynamic videotelephony device 102 for the dynamic video conference between the first user group 210 using the first dynamic videotelephony device 101 and the second user group 220 using the second dynamic videotelephony device 102.

In certain embodiments, each of the first dynamic videotelephony device 101 and the second dynamic videotelephony device 102 includes tablet computers, smart phones, electronic gaming devices, notebook computers, laptop computers, kiosks, computer monitors, security systems and television displays.

In certain embodiments, each of the first dynamic videotelephony device 101 and the second dynamic videotelephony device 102 includes: a corresponding dynamic video display device, a corresponding camera group, and a corresponding gaze detection device group, as described earlier in FIG. 1.

In certain embodiments, each of the first camera group and the second camera group includes one or more active compound focal depth cameras. Each of the first gaze detection device group and the second gaze detection device group includes one or more gaze detection devices. Each of the first user group 210 and the second user group 220 includes one or more users. In one embodiment, the first user group 210 includes one user 211, positioned in front of the first dynamic videotelephony device 101 having a focal distance of d11. The second user group 220 includes a first user 221, a second user 222, and a third user 223, positioned in front of the second dynamic videotelephony device 102 with focal distances of d21, d22, and d23, respectively.

In certain embodiments, the first dynamic video display device on the first dynamic videotelephony device 101 displays a visual scene of the second user group 220. The second dynamic video display device on the second dynamic videotelephony device 102 displays a visual scene of the first user group 210.

In certain embodiments, the first camera group captures dynamic video signals of the first user group 210, transmits, over the network 140, the captured dynamic video signals to the second dynamic videotelephony device 102 to be displayed on the second dynamic video display device of the second dynamic videotelephony device 102. The second camera group captures dynamic video signals of the second user group 220, transmits, over the network 140, the captured dynamic video signals to the first dynamic videotelephony device 101 to be displayed on the first dynamic video display device of the first dynamic videotelephony device 101.

In certain embodiments, the first gaze detection device group detects and tracks a first principal location of pupils of the first user group 210 and transmits the first principal location of pupils of the first user group 210 on the first dynamic video display device to the second dynamic videotelephony device 102 as a part of control instructions to control the second camera group of the second dynamic videotelephony device 102. The second gaze detection device group detects and tracks a second principal location of pupils of the second user group 220 and transmits the second principal location of pupils of the second user group 220 on the second dynamic video display device to the first dynamic videotelephony device 101 as a part of control instructions to control the first camera group of the first dynamic videotelephony device 102.

In certain embodiments, a portion of the dynamic video signals of the visual scene of the second user group 220 is transmitted to the first dynamic videotelephony device 101 and is displayed on the first dynamic video display device of the first dynamic videotelephony device 101. The portion of the dynamic video signals is selected from the dynamic video signals captured by the second camera group of the second dynamic videotelephony device 102, and the selected portion of the dynamic video signals is focused and centered at an object corresponding to the first principal location of pupils of the first user group 210 on the first dynamic video display device of the first dynamic videotelephony device 101. A portion of the dynamic video signals of the visual scene of the first user group 210 is transmitted to the second dynamic videotelephony device 102 and is displayed on the second dynamic video display device of the second dynamic videotelephony device 102. The portion of the dynamic video signals is selected from the dynamic video signals captured by the first camera group of the first dynamic videotelephony device 101, and the selected portion of the dynamic video signals is focused and centered at an object corresponding to the second principal location of pupils of the second user group 220 on the second dynamic video display device of the second dynamic videotelephony device 102.

In certain embodiments, the first principal location of pupils of the first user group 210 is a location of pupils of a person of the first user group 210 at or near a center of the visual scene of the first user group 210, and the second principal location of pupils of the second user group 220 is a location of pupils of a person of the second user group 220 at or near a center of the visual scene of the second user group 220.

In certain embodiments, the first dynamic videotelephony device 101 has a first dynamic videotelephony device controller, and the second dynamic videotelephony device 102 has a second dynamic videotelephony device controller. The first dynamic videotelephony device controller has a first network interface controller, a first processor, and a first non-transitory storage medium. The second dynamic videotelephony device controller has a second network interface controller, a second processor, and a second non-transitory storage medium. Each of the first network interface controller and the second network interface controller connects the corresponding dynamic videotelephony device 101/102 to the network 140, respectively. The first non-transitory storage medium stores a first set of computer executable instructions, and when executed by the first processor, the first set of computer executable instructions cause the first processor to perform certain functions of the first dynamic videotelephony device 101. The second non-transitory storage medium stores a second set of computer executable instruc-tions, and when executed by the second processor, the second set of computer executable instructions cause the second processor to perform certain functions of the second dynamic videotelephony device 102.

In certain embodiments, the first set of computer executable instructions includes: a first network interface module, a first camera interface module, a first gaze detection interface module, and a first dynamic display interface module. The second set of computer executable instructions includes: a second network interface module, a second camera interface module, a second gaze detection interface module, and a second dynamic display interface module.

The first network interface module transmits control instructions and captured dynamic video signals to the second dynamic videotelephony device 102 and receives control instructions and captured dynamic video signals from the second dynamic videotelephony device 102 through the first network interface controller over the network 140. The second network interface module transmits control instructions and captured dynamic video signals to the first dynamic videotelephony device 101 and receives control instructions and captured dynamic video signals from the first dynamic videotelephony device 101 through the second network interface controller over the network 140.

The first camera interface module receives the control instructions from the second dynamic videotelephony device 102 to focus on one or more objects of the first visual scene, captures the dynamic video signals of the first visual scene using the first camera group, and transmits the captured dynamic video signals to the second dynamic videotelephony device 102. The second camera interface module receives the control instructions from the first dynamic videotelephony device 101 to focus on one or more objects of the second visual scene, captures the dynamic video signals of the second visual scene using the second camera group, and transmits the captured dynamic video signals to the first dynamic videotelephony device 101.

The first gaze detection interface module detects and tracks a first principal location of pupils of the first user group 210, and transmits the control instructions having the first principal location of pupils of the first user group 210 on the first dynamic video display device to the second dynamic videotelephony device 102 to control the second camera group of the second dynamic videotelephony device 102. The second gaze detection interface module detects and tracks a second principal location of pupils of the second user group 220, and transmits the control instructions having the second principal location of pupils of the second user group 220 on the second dynamic video display device to the first dynamic videotelephony device 101 to control the first camera group of the first dynamic videotelephony device 101.

The first dynamic display interface module receives the dynamic video signals captured by the second dynamic videotelephony device 102, processes the received dynamic video signals to determine the portion of the dynamic video signals to display on the first dynamic video display device according to the control instructions such that the displayed portion of the dynamic video signals is focused and centered at the object corresponding to the first principal location of pupils of the first user group 210 on the first dynamic video display device. The second dynamic display interface module receives the dynamic video signals captured by the first dynamic videotelephony device 101, and processes the received dynamic video signals to determine the portion of the dynamic video signals to display on the second dynamic video display device according to the control instructions such that the displayed portion of the dynamic video signals is focused and centered at the object corresponding to the second principal location of pupils of the second user group 220 on the second dynamic video display device.

Figure 6:
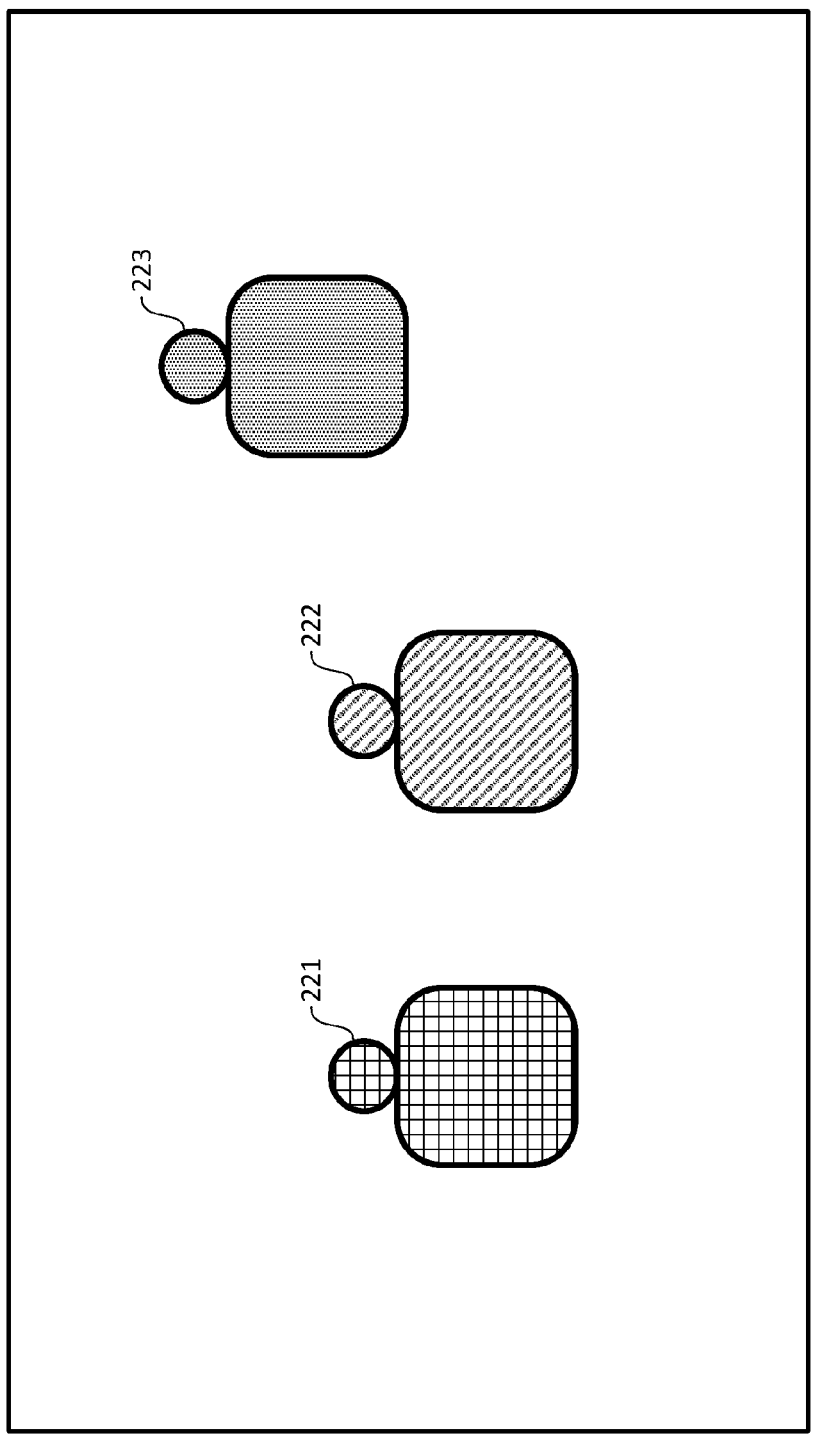
FIG. 6 shows an exemplary visual scene of the second user group captured by the second dynamic videotelephony device according to another embodiment of the present disclosure.

Referring now to FIG. 6, an overall visual scene of the second user group 220 captured by the second dynamic videotelephony device 102 is shown according to certain embodiments of the present disclosure. The overall visual scene of the second user group 220 is shown in a display screen 151 of the first dynamic video display device of the first dynamic videotelephony device 101. On the display screen 151 of the first dynamic video display device, the first user 221 is shown on the left, the second user 222 is shown in the middle, and the third user 223 is shown near the upper right corner.

Figure 7A:
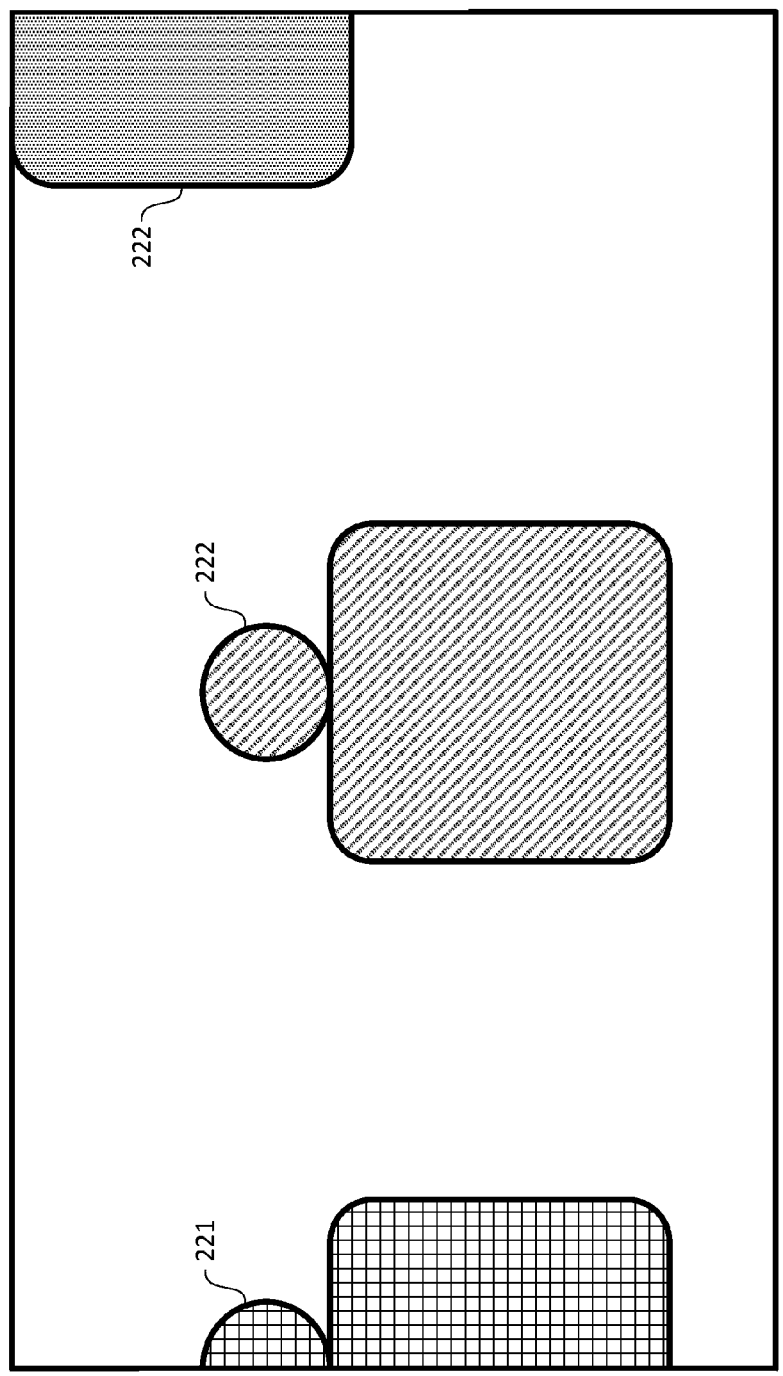

In certain embodiments, when the principal location of the pupils of the first user group 210 falls on the second user 222 of the second group 220, the gaze detection device group 120 detects and tracks the first principal location of pupils of the first user group 210 on the first dynamic video display device of the first dynamic videotelephony device 101, and transmits the first principal location of pupils of the first user group 210 to the second dynamic videotelephony device 102 to control the second camera group of the second dynamic videotelephony device 102. A portion of the dynamic video signals of the visual scene of the second user group 220 is transmitted to the first dynamic videotelephony device 101 and displayed on the first dynamic video display device of the first dynamic videotelephony device 101. The portion of the dynamic video signals is selected from the dynamic video signals captured by the second camera group, and the selected portion of the dynamic video signals is focused and centered at the second user 222 of the second user group 220, where the first principal location of pupils of the first user group 210 falls on the first dynamic video display device of the first dynamic videotelephony device 101, as shown in FIG. 7A.

Figure 7B:
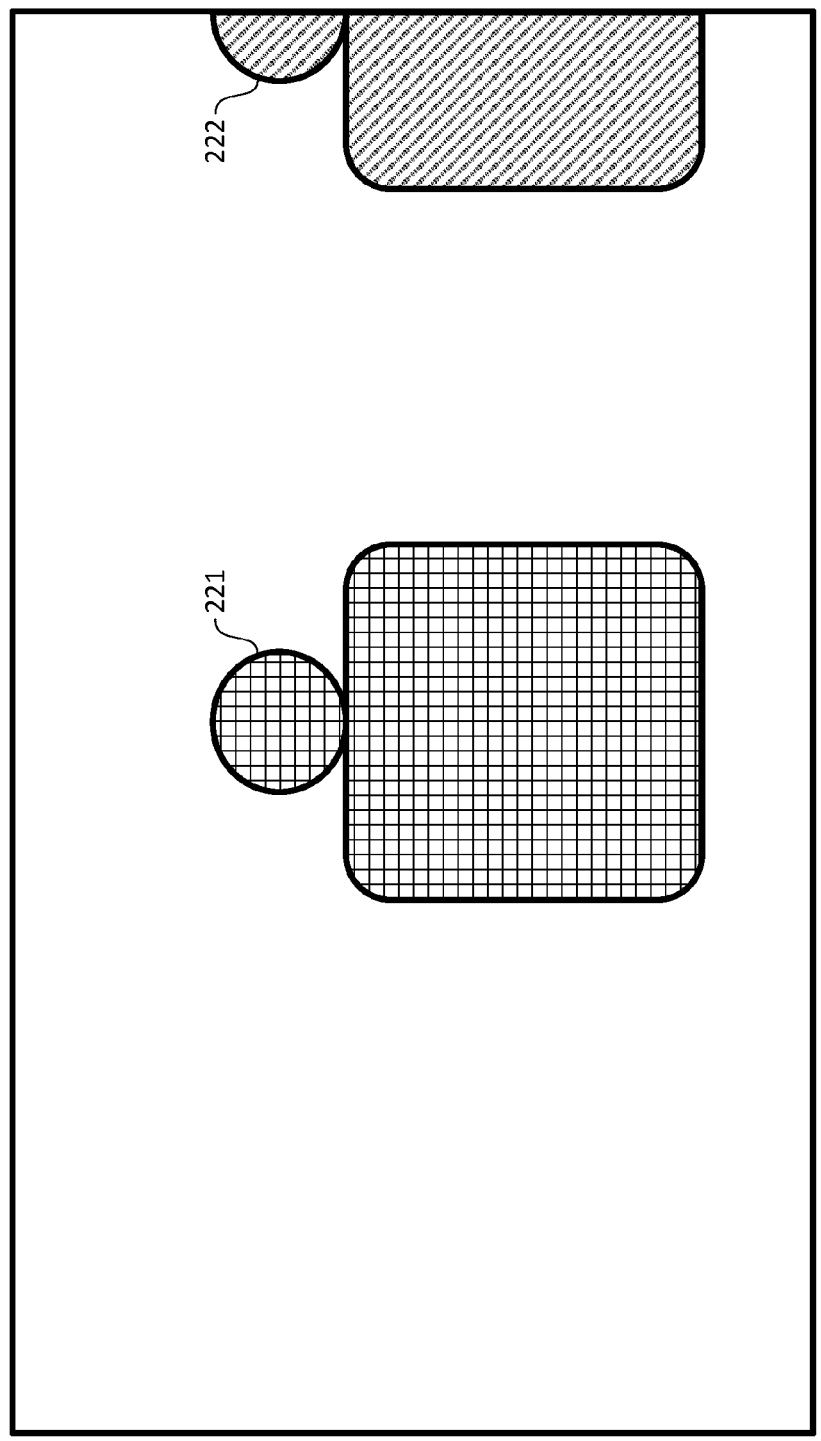

In certain embodiments, when the principal location of the pupils of the first user group 210 moves to the first user 221 of the second group 220, the gaze detection device group 120 detects and tracks the first principal location of pupils of the first user group 210 on the first dynamic video display device of the first dynamic videotelephony device 101, and transmits the first principal location of pupils of the first user group 210 to the second dynamic videotelephony device 102 to control the second camera group of the second dynamic videotelephony device 102. Another portion of the dynamic video signals of the visual scene of the second user group 220 is transmitted to the first dynamic videotelephony device 101 and displayed on the first dynamic video display device of the first dynamic videotelephony device 101. The portion of the dynamic video signals is selected from the dynamic video signals captured by the second camera group, and the selected portion of the dynamic video signals is focused and centered at the first user 221 of the second user group 220, where the first principal location of pupils of the first user group 210 falls on the first dynamic video display device of the first dynamic videotelephony device 101, as shown in FIG. 7B.

In certain embodiments, when the principal location of the pupils of the first user group 210 moves to the third user 223 of the second group 220, the gaze detection device group 120 detects and tracks the first principal location of pupils of the first user group 210 on the first dynamic video display device of the first dynamic videotelephony device 101, and transmits the first principal location of pupils of the first user group 210 to the second dynamic videotelephony device 102 to control the second camera group of the second dynamic videotelephony device 102. Yet another portion of the dynamic video signals of the visual scene of the second user group 220 is transmitted to the first dynamic videotelephony device 101 and displayed on the first dynamic video display device of the first dynamic videotelephony device 101. The portion of the dynamic video signals is selected from the dynamic video signals captured by the second camera group, and the selected portion of the dynamic video signals is focused and centered at the third user 223 of the second user group 220, where the first principal location of pupils of the first user group 210 falls on the first dynamic video display device of the first dynamic videotelephony device 101, as shown in FIG. 7C.

Therefore, the portion of the dynamic video signals is selected from the dynamic video signals captured by the second camera group is automatically controlled by the gaze of the first user group 210. The visual scene of the second user group 220 is focused and centered at the object/user on the display screen in front of the first user 211, and can be changed by simply moving the gaze of the first user 211, instead of controlling a remote video camera using certain control equipment and/or certain control command from the first user's end.

Figure 8:
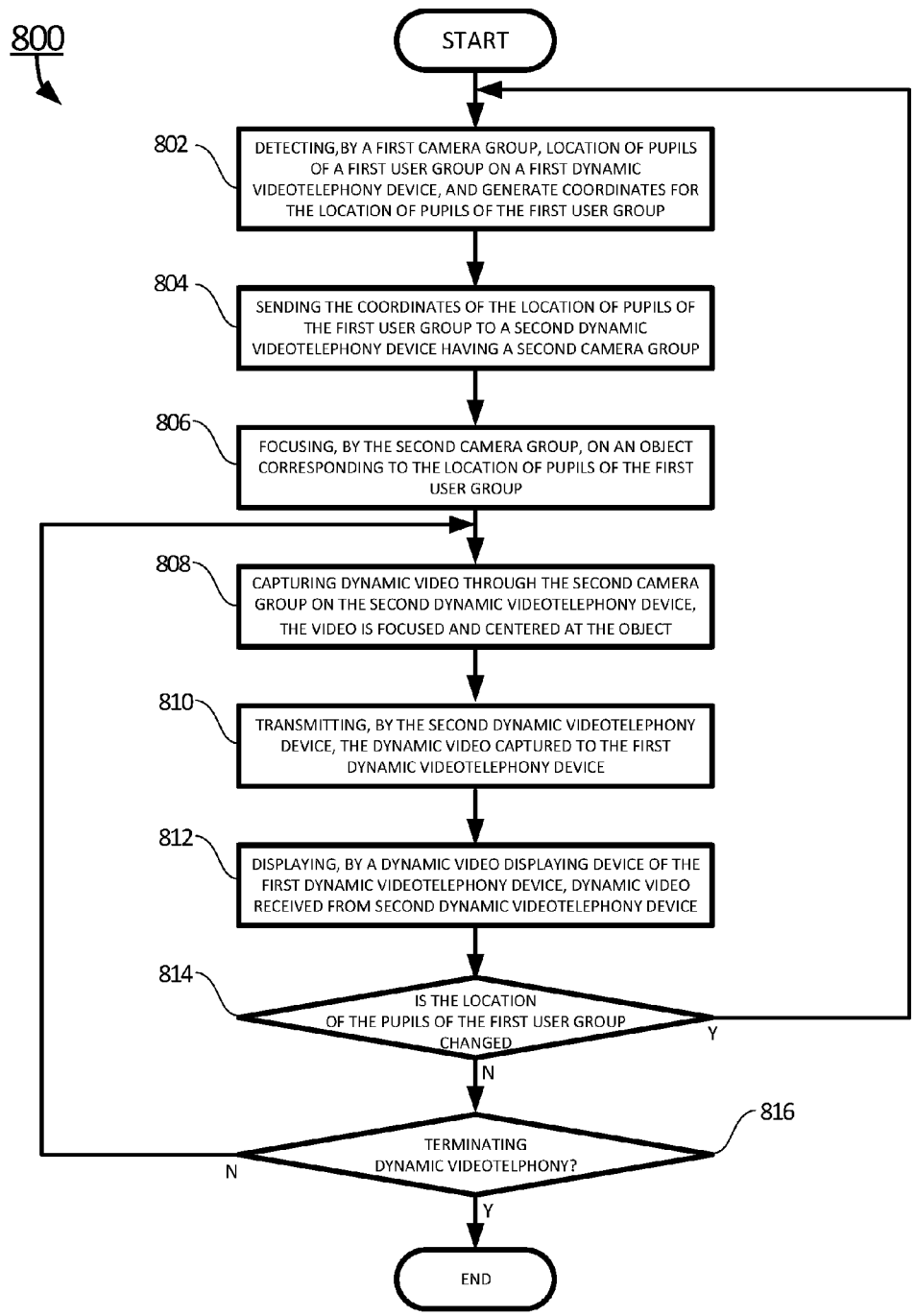
FIG. 8 is a flow chart illustrating a method of holding a video conference using the dynamic videotelephony system according to certain embodiments of the present disclosure.

In yet another aspect, the present disclosure relates to a method 800, as shown in FIG. 8, of holding a dynamic video conference between a first user group 210 using a first dynamic videotelephony device 101 and a second user group 220 using a second dynamic videotelephony device 102, and the first dynamic videotelephony device 101 and the second dynamic videotelephony device 102 are connected with a network 140.

In certain embodiments, each of the first dynamic videotelephony device 101 and the second dynamic videotelephony device 102 includes tablet computers, smart phones, electronic gaming devices, notebook computers, laptop computers, kiosks, computer monitors, security systems and television displays.

In certain embodiments, each of the first dynamic videotelephony device 101 and the second dynamic videotelephony device 102 includes: a corresponding dynamic video display device, a corresponding camera group, and a corresponding gaze detection device group, as described earlier in FIG. 1.

At block 802, a first gaze detection device group of the first dynamic videotelephony device 101 detects and tracks a first principal location of pupils of the first user group 210 on the first dynamic video display device of the first dynamic videotelephony device 101. When the first user group 210 includes more than one person, it is difficult for the gaze detection devices differentiate gazes of different people. Therefore, in certain embodiments, the principal location of pupils of the first user group 210 is defined as a location of pupils of a person of the first user group 210 at or near a center of a visual scene of the first user group 210. In the embodiment shown in FIG. 5, the principal location of pupils of the first user group 210 is the location of pupils of the first user 211.

At block 804, the first dynamic videotelephony device 101 transmits certain control instructions, through the network 140, to the second dynamic videotelephony device 102 to control the second camera group of the second dynamic videotelephony device 102. The control instructions include the principal location of pupils of the first user group 210 on the first dynamic video display device.

At block 806, the control instructions received by the second dynamic videotelephony device 102 cause the second camera group of the second dynamic videotelephony device 102 to control camera orientation and focus on an object or a user where the principal location of pupils of the first user group 210 falls on the first dynamic video display device of the first dynamic videotelephony device 101.

At block 808, the control instructions received by the second dynamic videotelephony device 102 cause the second camera group of the second dynamic videotelephony device 102 to capture dynamic video signals of the visual scene of the second user group 220 through the second camera group of the second dynamic videotelephony device 102.

At block 810, the control instructions received by the second dynamic videotelephony device 102 cause the second dynamic videotelephony device 102 to transmit the captured dynamic video signals of the visual scene of the second user group 220 back to the first dynamic videotelephony device 101.

At block 812, the first dynamic videotelephony device 101 receives the captured dynamic video signals of the visual scene of the second user group 220 from the second dynamic videotelephony device 102, and displays the received dynamic video signals on the first dynamic video display device of the first dynamic videotelephony device 101.

At query block 814, the first gaze detection device group of the first dynamic videotelephony device 101 constantly monitors the first principal location of pupils of the first user group 210, and check to see whether the first principal location of pupils of the first user group 210 has changed. When the first principal location of pupils of the first user group 210 is changed, the method returns back to block 802 to start the process again. Otherwise, when the first principal location of pupils of the first user group 210 is not changed, the method continues to query block 816.

At query block 816, the first gaze detection device group of the first dynamic videotelephony device 101 checks whether the first user 211 wants to terminate the dynamic video conference. When the first user 211 wants to terminate the dynamic video conference, the method terminates the process and exits through the end block. Otherwise, when the first user 211 wants to continue the dynamic video conference, the method continues to block 808 and continues the dynamic video conference.

The method is executed in a similar way on the second dynamic videotelephony device 102.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A dynamic videotelephony device, comprising:
   a dynamic video display device to display a visual scene of a second user group to a first user group, wherein the second user group is using a second dynamic videotelephony device to hold a dynamic video conference with the first user group;
   a camera group to capture dynamic video signals of the first user group, transmit, over a network, the captured dynamic video signals to the second dynamic videotelephony device to be displayed on a second dynamic video display device of the second dynamic videotelephony device; and
   a gaze detection device group to detect and track a principal location of pupils of the first user group on the dynamic video display device and transmit the principal location of pupils of the first user group to the second dynamic videotelephony device to control a second camera group of the second dynamic videotelephony device,
   wherein a portion of the dynamic video signals of the visual scene of the second user group is transmitted to the dynamic videotelephony device and displayed on the dynamic video display device of the dynamic videotelephony device, wherein the portion of the dynamic video signals is selected from the dynamic video signals captured by the second camera group of the second dynamic videotelephony device, and the selected portion of the dynamic video signals is focused and centered at an object corresponding to the principal location of pupils of the first user group on the dynamic video display device.

2. The dynamic videotelephony device of claim 1, wherein the dynamic videotelephony device comprises tablet computers, smart phones, electronic gaming devices, notebook computers, laptop computers, kiosks, computer monitors, security systems and television displays.

3. The dynamic videotelephony device of claim 1, wherein the camera group comprises one or more active compound focal depth cameras, the gaze detection device group comprises one or more gaze detection devices, each of the first user group and the second user group comprises one or more users.

4. The dynamic videotelephony device of claim 1, wherein the principal location of pupils of the first user group is a location of pupils of a person of the first user group at or near a center of a visual scene of the first user group.

5. The dynamic videotelephony device of claim 1, further comprising:
   a dynamic videotelephony device controller, wherein the dynamic videotelephony device controller comprises:
      a network interface controller to connect the dynamic videotelephony device to the network;
      a processor; and
      a non-transitory storage medium having computer executable instructions embodied therewith, when executed by the processor, the computer executable instructions cause the processor to perform a plurality of functions of the dynamic videotelephony device.

6. The dynamic videotelephony device of claim 5, wherein the computer executable instructions comprise:
   a network interface module to transmit and receive control instructions and the captured dynamic video signals to and from the second dynamic videotelephony device through the network interface controller over the network;

a camera interface module to receive the control instructions to focus one or more objects of the visual scene, to capture the dynamic video signals of the visual scene using the camera group, and transmit the captured dynamic video signals to the second dynamic videotelephony device;

a gaze detection interface module to detect and track the principal location of pupils of the first user group, and transmit the control instructions having the principal location of pupils of the first user group on the dynamic video display device to the second dynamic videotelephony device to control the second camera group of the second dynamic videotelephony device; and a dynamic display interface module to receive the dynamic video signals captured by the second dynamic videotelephony device, process the received dynamic video signals to determine the portion of the dynamic video signals to display on the dynamic video display device according to the control instructions such that the displayed portion of the dynamic video signals is focused and centered at the object corresponding to the principal location of pupils of the first user group on the dynamic video display device.

7. The dynamic videotelephony device of claim 1, wherein the dynamic video display device comprises an audio playback device for playing audio signals of the dynamic video signals received from the second camera group of the second dynamic videotelephony device.

8. The dynamic videotelephony device of claim 1, wherein the network comprises the internet, an intranet, a Wi-Fi network, a Bluetooth connection, an enterprise network, a local area network (LAN), a wide area network (WAN), a metropolitan area network (MAN), a campus area network (CAN), a virtual private network (VPN), a telecommunication network, and a wireless communication network.

9. A dynamic videotelephony system, comprising:
at least a first dynamic videotelephony device as a host of a dynamic video conference for a first user group;
an opposite, second dynamic videotelephony device as a participant of the dynamic video conference for a second user group; and
a network connecting the first dynamic videotelephony device and the second dynamic videotelephony device for the dynamic video conference between the first user group and the second user group,
wherein each of the first dynamic videotelephony device and the second dynamic videotelephony device comprises:
a corresponding dynamic video display device on the corresponding dynamic videotelephony device to display a visual scene of opposite user group;
a corresponding camera group to capture dynamic video signals of the corresponding user group, transmit, over the network, the captured dynamic video signals to the opposite dynamic videotelephony device to be displayed on the opposite dynamic video display device of the opposite dynamic videotelephony device; and
a corresponding gaze detection device group to detect and track a corresponding principal location of pupils of the corresponding user group and transmit the corresponding principal location of pupils of the corresponding user group on the corresponding dynamic video display device to the opposite dynamic videotelephony device to control an opposite camera group of the opposite dynamic videotelephony device, wherein a portion of the dynamic video signals of the visual scene of the opposite user group is transmitted to the corresponding dynamic videotelephony device and displayed on the corresponding dynamic video display device of the corresponding dynamic videotelephony device, wherein the portion of the dynamic video signals is selected from the dynamic video signals captured by the opposite camera group of the opposite dynamic videotelephony device, and the selected portion of the dynamic video signals is focused and centered at an object corresponding to the corresponding principal location of pupils of the corresponding user group on the corresponding dynamic video display device.

10. The dynamic videotelephony system of claim 9, wherein each of the first dynamic videotelephony device and the second dynamic videotelephony device comprises tablet computers, smart phones, electronic gaming devices, notebook computers, laptop computers, kiosks, computer monitors, security systems, and television displays.

11. The dynamic videotelephony system of claim 9, wherein each of the first camera group and the second camera group comprises one or more active compound focal depth cameras, and each of the first gaze detection device group and the second gaze detection device group comprises one or more gaze detection devices, and each of the first user group and the second user group comprises one or more users.

12. The dynamic videotelephony system of claim 9, wherein the first principal location of pupils of the first user group is a location of pupils of a person of the first user group at or near a center of the visual scene of the first user group, and the second principal location of pupils of the second user group is a location of pupils of a person of the second user group at or near a center of the visual scene of the second user group.

13. The dynamic videotelephony system of claim 9, wherein each of the first dynamic videotelephony device and the second dynamic videotelephony device comprises: a corresponding dynamic videotelephony device controller, respectively, wherein each of the first dynamic videotelephony device controller, and the second dynamic videotelephony device controller comprise:
a corresponding network interface controller to connect the corresponding dynamic videotelephony device to the network, respectively;
a corresponding processor; and
a corresponding non-transitory storage medium having a corresponding set of computer executable instructions embodied therewith, when executed by the corresponding processor, the corresponding set of computer executable instructions cause the corresponding processor to perform a plurality of functions of the corresponding dynamic videotelephony device, respectively.

14. The dynamic videotelephony system of claim 13, wherein each of the first set of computer executable instructions and the second set of computer executable instructions comprises:
a corresponding network interface module to transmit and receive control instructions and captured dynamic video signals to and from the opposite dynamic videotelephony device through the correspond network interface controller, respectively;
a corresponding camera interface module to receive the control instructions from the opposite dynamic videotelephony device to focus one or more objects of the corresponding visual scene, to capture the dynamic video signals of the corresponding visual scene using the corresponding camera group, and transmit the captured dynamic video signals to the opposite dynamic videotelephony device, respectively;

a corresponding gaze detection interface module to detect and track a corresponding principal location of pupils of the corresponding user group, and transmit the control instructions having the first principal location of pupils of the corresponding user group on the corresponding dynamic video display device to the opposite dynamic videotelephony device to control the opposite camera group of the opposite dynamic videotelephony device, respectively; and a corresponding dynamic display interface module to receive the dynamic video signals captured by the opposite dynamic videotelephony device, process the received dynamic video signals to determine the portion of the dynamic video signals to display on the corresponding dynamic video display device according to the control instructions such that the displayed portion of the dynamic video signals is focused and centered at the object corresponding to the corresponding principal location of pupils of the corresponding user group on the dynamic video display device, respectively.

15. A method of holding a dynamic video conference between a first dynamic videotelephony device and a second dynamic videotelephony device, comprising:

connecting, by the first dynamic videotelephony device having a first camera group and a first gaze detection device group, to the second dynamic videotelephony device having a second camera group and a second gaze detection device group through a network;

receiving, by the first dynamic videotelephony device, dynamic video signals of a second user group captured by the second camera group of the second dynamic videotelephony device, and displaying the received dynamic video signals on a first dynamic video display device of the first dynamic videotelephony device;

detecting, by a first gaze detection device group of the first dynamic videotelephony device, a principal location of the pupils of a first user group on the first dynamic video display device, wherein the principal location of the pupils of the first user group is a location of pupils of a person of the first user group at or near a center of a visual scene of the first user group, and generating coordinates of the principal location of the pupils of the first user group;

sending, by the first dynamic videotelephony device, control instructions having the coordinates of the principal location of the pupils of the first user group to the second dynamic videotelephony device, when executed by a processor of the second dynamic videotelephony device, the control instructions cause the second dynamic videotelephony device to focus on the object corresponding to the coordinates of the principal location of the pupils of the first user group shown on the first dynamic video display device, to capture dynamic video signals through the second camera group, and to transmit the captured dynamic video signals to the first dynamic videotelephony device to display on the first dynamic video display device of the first dynamic videotelephony device, wherein the captured dynamic video signals are focused and centered at the object shown on the coordinates of the principal location of the pupils of the first user group.

16. The method of claim 15, further comprising:

tracking, by a first gaze detection device group of the first dynamic videotelephony device, the principal location of the pupils of the first user group on the first dynamic video display device, and generating new coordinates of the principal location of the pupils of the first user group when the principal location of the pupils of the first user group on the first dynamic video display device is changed; and sending, by the first dynamic videotelephony device, control instructions having the new coordinates of the principal location of the pupils of the first user group to the second dynamic videotelephony device, when executed by the second dynamic videotelephony device, the control instructions cause the second dynamic videotelephony device to focus on a new object corresponding to the new coordinates of the principal location of the pupils of the first user group shown on the first dynamic video display device, to capture dynamic video signals through the second camera group, wherein the captured dynamic video signals are focused and centered at the new object shown on the new coordinates of the principal location of the pupils of the first user group, and to transmit the captured dynamic video signals to the first dynamic videotelephony device.

17. The method of claim 15, wherein the network comprises the internet, an intranet, a Wi-Fi network, an enterprise network, a local area network, a wide area network, a telecommunication network, and a mobile communication network.

18. The method of claim 15, wherein the each of the first dynamic videotelephony device and the second dynamic videotelephony device comprises: tablet computers, smart phones, electronic gaming devices, notebook computers, laptop computers, kiosks, computer monitors, security systems and television displays.

19. The method of claim 15, wherein each of the first camera group and the second camera group comprises one or more active compound focal depth cameras, each of the first gaze detection device group and the second gaze detection device group comprises one or more gaze detection devices, and each of the first user group and the second user group comprises one or more users.

* * * * *